United States Patent [19]
Oyama

[11] 4,114,916
[45] Sep. 19, 1978

[54] HAND TRUCK

[75] Inventor: Shoji Oyama, Chikushino, Japan

[73] Assignee: Kuniko Saita, Fukuoka, Japan

[21] Appl. No.: 800,250

[22] Filed: May 25, 1977

[51] Int. Cl.² ............................................. B62B 1/02
[52] U.S. Cl. .................................................. 280/47.29
[58] Field of Search ................ 280/47.29, 47.27, 47.24

[56] References Cited
U.S. PATENT DOCUMENTS 552,696   1/1896   O'Neill .............................. 280/47.29

FOREIGN PATENT DOCUMENTS 728,435   7/1932   France ................................... 280/47.29
259,274  10/1926   United Kingdom .................. 280/47.29

Primary Examiner—Joseph F. Peters, Jr.
Assistant Examiner—R. Schrecengost
Attorney, Agent, or Firm—Frank J. Jordan

[57] ABSTRACT

A hand truck includes a main load-supporting frame and a temporary load-supporting section at one end thereof slidably supported on the main frame such that pivotal movement of the hand truck about is wheels results in a shifting of the center of gravity of the material loaded on the main frame toward the axes of the wheels.

5 Claims, 5 Drawing Figures

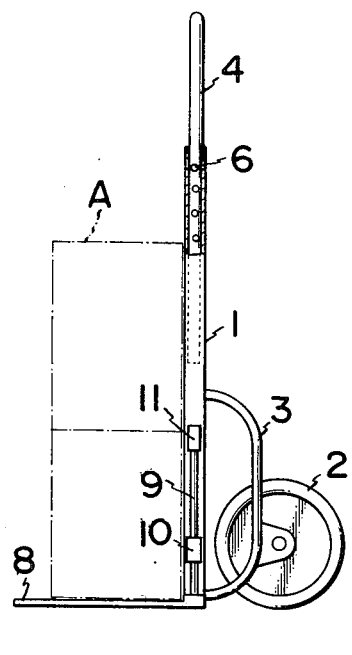
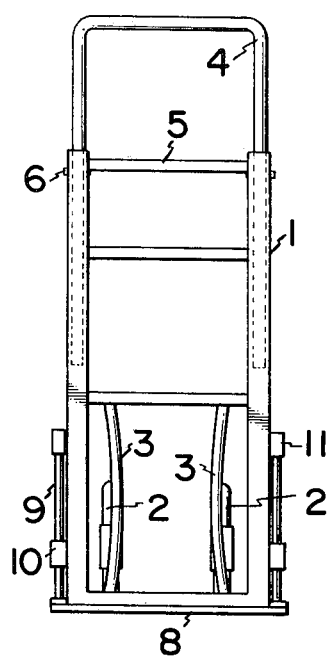
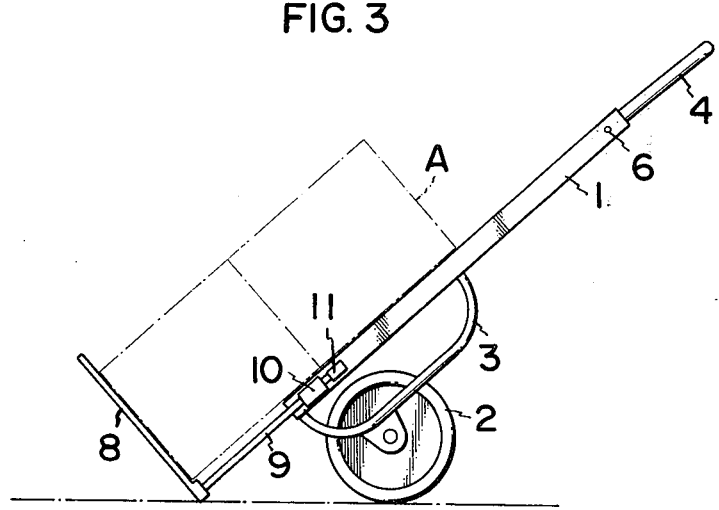

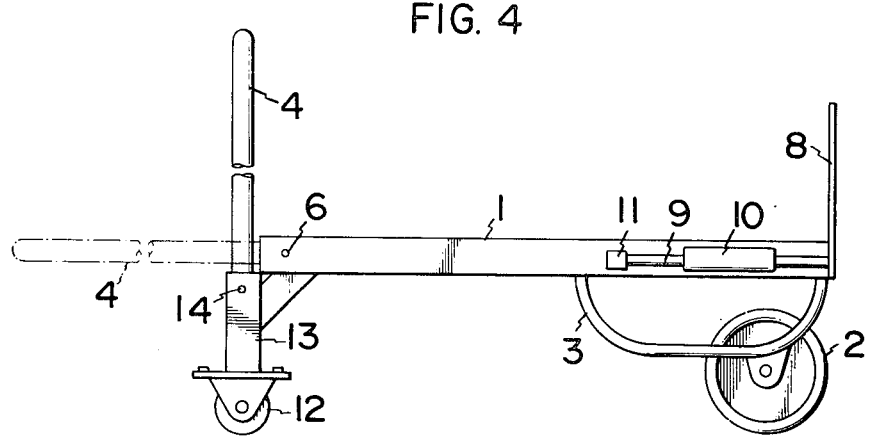
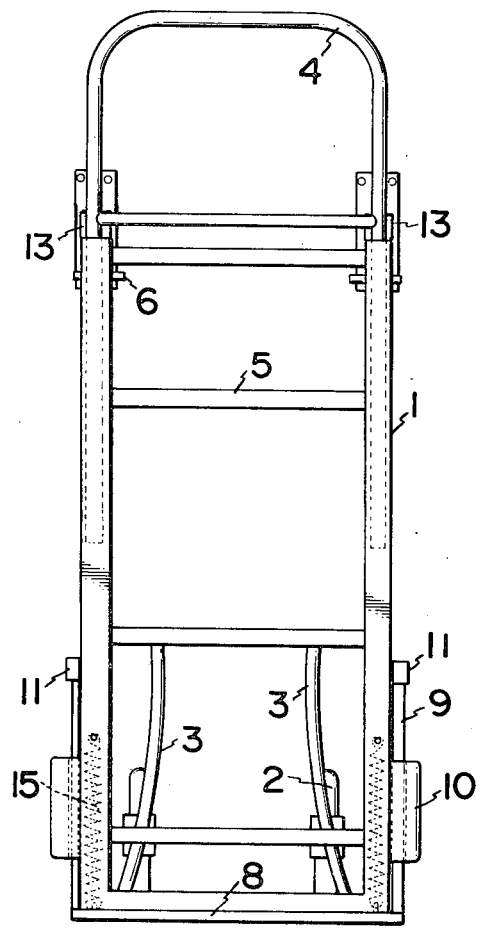

HAND TRUCK

BACKGROUND OF THE INVENTION

This invention relates to an improvement of a hand truck which, in general, is constructed such that materials such as bottles, gas cylinders or bricks can be loaded onto an L-shaped frame having a main load-supporting surface and which, when the frame is pivoted about its wheels, the main load-supporting surface takes a horizontal or inclined position relative to the ground.

In the conventional type of hand truck, a temporary loading section of the frame upon which material is temporarily loaded when the main frame is positioned in an upright position, is fixedly secured to the front end of the main frame. Frequently more than one individual is required to pull down the hand truck to pivot it from the above upright position to its horizontal or inclined position for transport of the load from one location to another.

Furthermore, even during the transporting of the material, the operator must support the frame in its horizontal or slightly inclined attitude with considerable strength since the hand truck does not provide optimum balancing of the material on the main frame.

SUMMARY OF THE INVENTION

It is an object of the present invention to provide an improved hand truck having a balancing mechanism which serves to reduce the manual strength required for manipulation of the hand truck thereby overcoming certain deficiencies of prior hand trucks.

It is another object of the present invention to provide a hand truck of improved construction including a temporary material loading section mounted at the front thereof arranged such that it is slidable relative to the main frame and whereby the hand truck when loaded with a substantially heavy load can be handled in a balanced condition.

Other objects and advantages of the invention will become readily apparent to persons versed in the art from the ensuing description of the invention.

BRIEF DESCRIPTION OF THE DRAWINGS

FIG. 1 is a side view of the hand truck of this invention with its main frame in an upright position.

FIG. 2 is a front view of the hand truck shown in FIG. 1.

FIG. 3 is a side view of the hand truck of FIG. 1 in a position with the main load-supporting frame pivoted downwardly and in which position the temporary load holding section is shown as being shifted away from the main frame together with the loaded material.

FIG. 4 is a side view of a modification of the hand truck of FIG. 1-3 which is provided with auxiliary wheels for facilitating the manipulation of the hand truck.

FIG. 5 is a front view of the modified hand truck with its main frame in an upright position similar to that of FIG. 2.

DETAILED DESCRIPTION OF THE INVENTION

The construction of the hand truck of this invention will first be described in conjunction with FIG. 1 through FIG. 3 of the drawings.

Referring to FIG. 1, the hand truck is shown as having a main frame 1 disposed in an upright position relative to the ground.

The front portion of the main frame 1 is provided with two spaced-apart wheels 2 desirably mounted by means of arcuate support frames or brackets 3 while at the rear end of the main frame 1, a handle 4 made of a single tube is attached thereto such that two spaced-apart free ends of the handle 4 can be inserted into the corresponding two spaced apart pipe means which form the main frame 1. The main frame 1 is provided together with transverse ribs 5. The free ends of the handle are provided with a plurality of spaced openings therein and openings are also formed in the rear end of each pipe means so that the handle 4 can be secured to the main frame 1 at a desired position relating thereto by stopper or detent pins 6.

At the end of the main frame 1 remote from handle 4, a temporary material holding section 8 is disposed having an element extending perpendicular to the main frame 1. The temporary material holding or support section 8 is movably disposed relative to the main frame 1.

The temporary load supporting section 8 is provided with two spaced-apart slide bars 9 which are disposed at the opposed sides of the main frame 1. These bars 9 are slidably mounted by means of support sleeves 10 which are, in turn, secured to the main frame 1.

The maximum slide length of the slide bars 9 relative to the main frame 1 is determined by stoppers 11 which are secured to the respective ends of the slide bars 9.

The manner in which the hand truck of this invention is operated is hereinafter disclosed.

The hand truck is initially positioned as shown in FIG. 1 wherein the main frame 1 is disposed perpendicular to the ground while the temporary material holding or supporting section extends parallel to and almost in contact with the ground.

Then the material A to be loaded, such as boxes containing bottles are loaded onto the temporary material holding section.

Subsequently, when the hand truck is pulled down to an inclined position as shown in FIG. 3 by an operator, the temporary material holding section 8 shifts away from the main frame 1 due to the weight of the loaded material and takes the position as shown in FIG. 3 with the main frame 1 in an inclined position and with the stoppers 11 almost in contact with the support sleeves 10.

At this stage of the operation, the substantial weight of the material has been shifted from the temporary material holding portion section 8 to the main frame 1 with the center of gravity of the loaded material moving closer to the axis of the wheels 2.

The hand truck can be further pivoted downwardly with minimum effort until the main frame 1 takes a position almost parallel to the ground.

The material is transported to a location where it is unloaded and, since the moment of force exerted by the material on the handle is reduced to a minimum due to the shifting of the center of gravity of the load, the operator can support the hand truck with a minimum amount of effort.

The unloading operation can be efficiently conducted by repeating the above steps in reverse order.

One modification of the above described hand truck is shown in FIG. 4 and FIG. 5.

In this modification, auxiliary wheels 12, which are of a universal joint type, are mounted at the top or front end of the main frame 1 by way of vertical support brackets 13 secured to the main frame 1.

These vertical support brackets 13 are also constructed such that they can accommodate the free ends of the U-shaped handle 4 with pins 14 to thereby secure the handle 4 to the vertical support brackets 13.

This modification also includes two spaced-apart tension springs 15 which are disposed within the pipe means support brackets 13 and have one end secured preferably to the transverse portion of the temporary material holding section.

These springs 15 function such that the temporary material holding section 8 can be readily retracted to a position as shown in FIG. 4 and FIG. 5 when the material A is unload from the hand truck.

Accordingly, the hand truck of the invention has the following advantages.

(a) Since the temporary load holding or supporting section is constructed such that it can be moved away from to the main frame, the center of gravity of the loaded material may be shifted closer to the axis of the wheels, whereby the loading and unloading of the material is made easier.

(b) By mounting the auxiliary wheels as well as the tension spring means, the loading and unloading operations are further facilitated.

What we claim is:

1. A hand truck comprising:
   a main frame for supporting a load thereon;
   a handle member releasably secured to one end of said main frame;
   a pair of wheels mounted on said main frame in longitudinally spaced relation to said handle member for movably supporting said main frame;
   a temporary load supporting section carried slidably by said main frame adjacent the end thereof remote from said handle member and having a portion thereof extending substantially perpendicular to the loading surface of said main frame;
   a pair of parallel spaced-apart slide bars disposed respectively at opposed sides of said main frame connected at the ends thereof to said temporary load supporting section, each of said slide bars being slidably carried by a support sleeve which is fixedly secured to said main frame; and
   a stopper member at the free end of such slide bars for limiting the slide length of said temporary load supporting section relative to said main frame.

2. A hand truck according to claim 1, including at least one auxiliary wheel mounted on said main frame adjacent said handle member.

3. A hand truck according to claim 1, wherein means are provided for resiliently mounting said temporary load supporting section on said main frame.

4. A hand truck according to claim 3, wherein said means for resiliently mounting said temporary load supporting section on said main frame comprises a pair of tension springs each of which have one end thereof connected to said main frame and the other end thereof connected to said temporary load supporting section.

5. A hand truck according to claim 1, wherein said handle member is U-shaped and the spaced-apart free ends thereof are releasably secured to said main frame by stopper pins.

* * * * *